April 30, 1935.  W. I. JONES  1,999,994
FASTENING DEVICE FOR MOLDINGS
Filed July 8, 1933

Inventor:
Walter I. Jones,
by Walter I. Jones
Atty.

Patented Apr. 30, 1935

1,999,994

UNITED STATES PATENT OFFICE 1,999,994

FASTENING DEVICE FOR MOLDING

Walter I. Jones, Arlington, Mass., assignor to United-Carr Fastener Corporation, Cambridge, Mass., a corporation of Massachusetts Application July 8, 1933, Serial No. 679,519

6 Claims. (Cl. 85—5)

My invention aims to provide improvements in fastener devices particularly useful in connection with securing together relatively thin sheet metal parts.

In the drawing which illustrates a preferred embodiment of my invention:—

Referring to the particular embodiment of my invention illustrated by the annexed drawing, I have shown an improved fastener device of the rotary operating type particularly, though not exclusively, useful in securing sheet metal moldings to relatively thin sheet metal structures.

Figure 5:
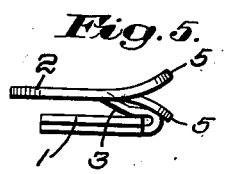
Fig. 5 is a side elevation of the fastener per se.
Figure 6:
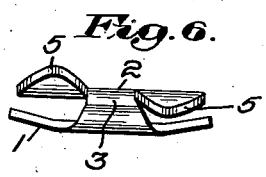
Fig. 6 is an end elevation of the fastener shown in Fig. 5.

The particular fastener illustrated is formed from a single piece of sheet metal and has a rectangular-shaped head portion 1, a generally circular-shaped attaching portion 2 and a yieldable connection 3 securing the two portions 1 and 2 together in spaced relation. The attaching portion 2 is provided with a notch 4 (Fig. 2) and the material of the base at opposite sides of the notch is bent out of the plane of the attaching portion to provide a pair of entering members 5—5. As shown in Figs. 5 and 6, the entering members 5—5 are so shaped and arranged that one extends upwardly and the other downwardly. The material cut out to provide the notch 4 forms the connecting portion 3 which extends from the inner end of the notch 4 to an outer edge of the head portion 1.

The assembly which I have illustrated in Figs. 1 through 4 includes a thin sheet metal supporting structure 6 having an aperture 7 therethrough, a molding 8 having a longitudinal groove 9 at its under side and the sheet metal fastener member above described. The assembly of the parts of the installation is a very simple matter and is accomplished by superposing the molding strip 8 upon the supporting structure 6 with the groove 9 in alignment with the aperture 7. Thereafter the fastener is turned into position by entering the upwardly bent entering member 5 of the attaching portion 2 through the aperture 7 and groove 9 and then turning the head portion 1. If desirable a slot 10 (Fig. 3) may be provided in the head portion 1 to receive a tool by which the fastener may be rotated. During the time that the fastener device is being rotated into position by a sort of screwing action, the fastener member adjusts itself to the combined thickness of the members 6 and 8 adjacent to the aperture 7 and groove 9. This adjustment takes place to increase the space between the superposed portions 1 and 2 due to the flexibility of the relatively narrow connection 3. In order to increase the flexibility of the device and improve its possibility of adaptation to various thicknesses of structures, I have also arched the head portion longitudinally so that a certain amount of the adjustment may take place in the head portion per se.

Figure 1:
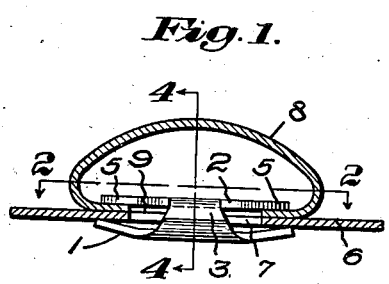
Figure 1 is a section through a trim strip installation showing the fastener device in elevation.
Figure 2:
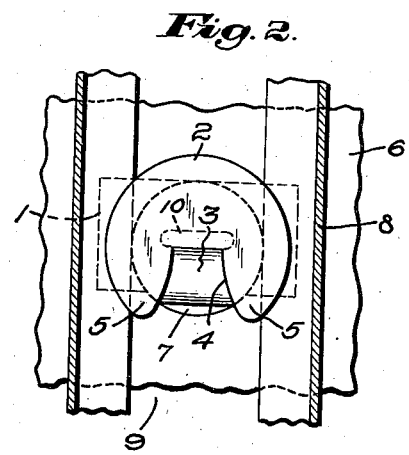
Fig. 2 is a section taken on the line 2—2 of Fig. 1.
Figure 3:
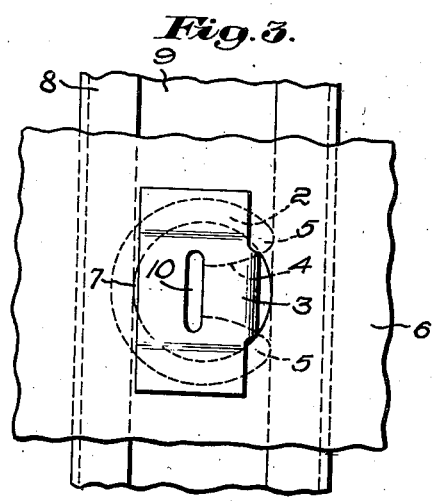
Fig. 3 is an under side plan view of the structure shown in Fig. 1, the fastener being partly rotated into interlocking position.
Figure 4:
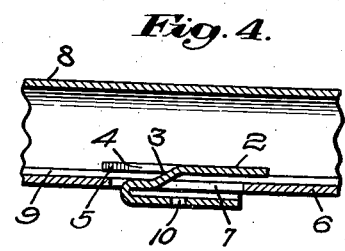
Fig. 4 is a section taken on the line 4—4 of Fig. 1.

During the attaching operation the attaching portion passes entirely through the aperture 7 and groove 9 until it lies against the inner face of the molding 8, as clearly shown in Figs. 1, 2 and 4. When the attachment is complete the head portion 1 rests against the supporting structure 6 adjacent to the aperture 7, as clearly illustrated in Fig. 1.

When it is desirable to disassemble the fastener device it is merely necessary to rotate it in the opposite direction from that in which it was rotated when being attached. During this reverse rotation the downwardly bent entering portion 5 of the attaching portion drops through the groove 9 and the opening 7 when it reaches a predetermined position and then engages beneath the supporting structure 6 so that upon continued rotation the fastener will be unscrewed from position.

My improved fastener is formed from a single piece of metal in such a manner that there is very little waste because the parts are so shaped and arranged that when the fastener is blanked most of the material is utilized to provide one portion or another of the fastener member. It is relatively simple in construction, durable and is particularly adapted for securing together members of varying thicknesses because of its flexible construction and since it is so constructed and arranged that it may be screwed into and out of position it is especially useful in structures like the described.

While I have illustrated and described a preferred embodiment of my invention, I do not wish to be limited thereby, because the scope of my invention is best defined by the following claims.

I claim:

1. A fastener device of the class described comprising, in combination, a head portion, an attaching portion disposed in spaced relation to said head, and an integral yieldable connection between said head portion and said attaching portion permitting relative movement toward and away from each other, and said attaching portion being provided with a notch extending inwardly from one edge thereof to permit a screwing action of the attaching portion through an aperture in a structure to be engaged by the fastener device.

2. A fastener device of the class described comprising, in combination, a head portion, an attaching portion disposed in spaced relation to said head, and an integral yieldable connection between said head portion and said attaching portion permitting relative movement toward and away from each other, said attaching portion being provided with a notch extending inwardly from one edge thereof to permit a screwing action of the attaching portion through an aperture in a structure to be engaged by the fastener device, and said attaching portion, at opposite sides of said notch, being bent in opposite directions to facilitate the screwing action.

3. A fastener device of the class described comprising, in combination, a head portion, an attaching portion disposed in spaced relation to said head, and an integral yieldable connection between said head portion and said attaching portion permitting relative movement toward and away from each other, and said attaching portion being provided with a notch extending inwardly from one edge thereof to permit a screwing action of the attaching portion through an aperture in a structure to be engaged by the fastener device, the said connection being formed from the material cut out to form the notch in the attaching portion and extending from about the center of the attaching portion to one edge of the head portion.

4. A fastener device of the class described formed from a single piece of sheet metal and having a head portion arched in cross-section to provide resiliency thereto, an attaching portion located beneath said head portion in spaced relation thereto and having a notch to permit insertion of the attaching portion through an aperture by a rotary motion, and a yieldable connection extending between and securing the said portions together in such a manner as to permit movement of one toward and away from the other.

5. A fastener device of the class described formed from a single piece of sheet metal and having a rectangular shaped head portion arched lengthwise in cross-section to provide resiliency thereto, a generally circular shaped attaching portion located beneath said head portion in spaced relation thereto and having a notch to permit insertion of the attaching portion through an aperture by a rotary motion, and a yieldable connection formed from the material of the attaching portion cut out to form said notch and extending between and securing the said portions together in such a manner as to permit movement of one toward and away from the other, and said attaching portion at opposite sides of said notch being bent out of the plane of the remainder of the attaching portion to facilitate attachment and detachment of the fastener device.

6. A fastener device of the class described comprising, in combination, a head portion, an attaching portion overlying said head in substantially parallel relation thereto, an integral yieldable connection extending from one edge of said head towards a point within the periphery thereof and in spaced relation thereto, and said connection joining said attaching portion at a point within the peripheral edge of said attaching portion thereby permitting parallel movement of one portion toward and away from the other.

WALTER I. JONES.